(12) United States Patent
Sood et al.

(10) Patent No.: US 8,369,254 B2
(45) Date of Patent: Feb. 5, 2013

(54) NETWORK INTERFACE APPARATUS

(75) Inventors: Kapil Sood, Beaverton, OR (US); Christian Maciocco, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1370 days.

(21) Appl. No.: 11/823,607

(22) Filed: Jun. 28, 2007

(65) Prior Publication Data

US 2009/0003319 A1    Jan. 1, 2009

(51) Int. Cl.
*G08C 17/00*    (2006.01)
(52) U.S. Cl. ........ 370/311; 370/352; 370/389; 370/392; 370/395.31; 726/15
(58) Field of Classification Search .................. 370/311, 370/352, 389, 392, 395.31, 409, 410; 726/15
See application file for complete search history.

(56) References Cited

U.S. PATENT DOCUMENTS

| | | | |
|---|---|---|---|
| 6,105,027 A * | 8/2000 | Schneider et al. ................. 1/1 |
| 6,493,824 B1 * | 12/2002 | Novoa et al. ................. 713/162 |
| 7,089,424 B1 * | 8/2006 | Subbiah ................. 713/189 |
| 7,594,262 B2 * | 9/2009 | Hanzlik et al. ................. 726/15 |
| 7,787,494 B1 * | 8/2010 | Aubin et al. ................. 370/468 |
| 2004/0068666 A1 * | 4/2004 | Tosey ................. 713/201 |
| 2007/0162582 A1 * | 7/2007 | Belali et al. ................. 709/223 |
| 2007/0238440 A1 * | 10/2007 | Sengupta et al. ................. 455/343.2 |

OTHER PUBLICATIONS

Benvenuti, Christian, Understanding Linux Network Internals, Dec. 2005, Chapter 18 Section 4.*

* cited by examiner

*Primary Examiner* — Chirag Shah
*Assistant Examiner* — Jenkey Van
(74) *Attorney, Agent, or Firm* — Forefront IP Lawgroup, PLLC

(57) ABSTRACT

An intelligent network interface apparatus to provide always-on, always-connected processing for call signals is described. One embodiment of the apparatus includes logic to selectively handle incoming call signals even when a computer to which the apparatus is operably connected is unavailable (e.g., asleep). The apparatus may also include logic for selectively waking up a sleeping computer upon determining that incoming call signals indicate that a communication with the computer is desired. The incoming call signals may be associated with a voice over internet protocol (VoIP) communication.

7 Claims, 4 Drawing Sheets

NETWORK INTERFACE APPARATUS

TECHNICAL FIELD

Embodiments of the invention relate to the field of networking. More particularly, at least one embodiment of the invention relates to an intelligent network apparatus for providing always-on, always-connected processing for call signals.

BACKGROUND

Computers may wish to communicate with each other. Conventionally, computers may have included communication hardware (e.g., network interface card (NIC)) to facilitate these communications. The NIC may have performed some computer communication functions while other computer communication functions may have been performed by a computer with which the NIC is associated and/or by an operating system running on the computer.

Computers may be idle for periods of time. When a computer is idle for a pre-determined, configurable period of time, the computer may decide to save energy and thus may enter a lower power state (e.g., sleep, S3). Unfortunately, a computer that enters a lower power state may appear to be off-line to a computer trying to communicate with the lower power state computer. While the lower power state computer may intend on receiving incoming calls and/or call signals, the computer may take so long to transition from a lower power state to a higher power state in which the call and/or call signal can be processed that the call signals may not be processed in a timely fashion and the computer may appear to be offline. The transition time may lead to incoming call signals being dropped. Thus, a computer that is online but asleep may appear offline to applications including voice over internet protocol (VoIP), instant messaging (IM), electronic mail (email), and so on.

In addition to computer hardware (e.g., NIC), a computer may include software (e.g., a networking stack) to facilitate communications. A computer communication may traverse several layers of a protocol "stack". A computer that enters a lower power state may drop outgoing call signals because applications operating at an upper level of the stack may not be aware that components at a lower level (e.g., physical layer) are in a temporarily unavailable (e.g., sleep) state. Thus, outgoing call signals may be dropped by, for example, a layer 2 network.

BRIEF DESCRIPTION OF THE DRAWINGS

The accompanying drawings, which are incorporated in and constitute a part of the specification, illustrate various example systems and other embodiments of various aspects of the invention. It will be appreciated that the illustrated element boundaries (e.g., boxes, groups of boxes, or other shapes) in the figures represent one example of the boundaries.

DETAILED DESCRIPTION

Figure 1:
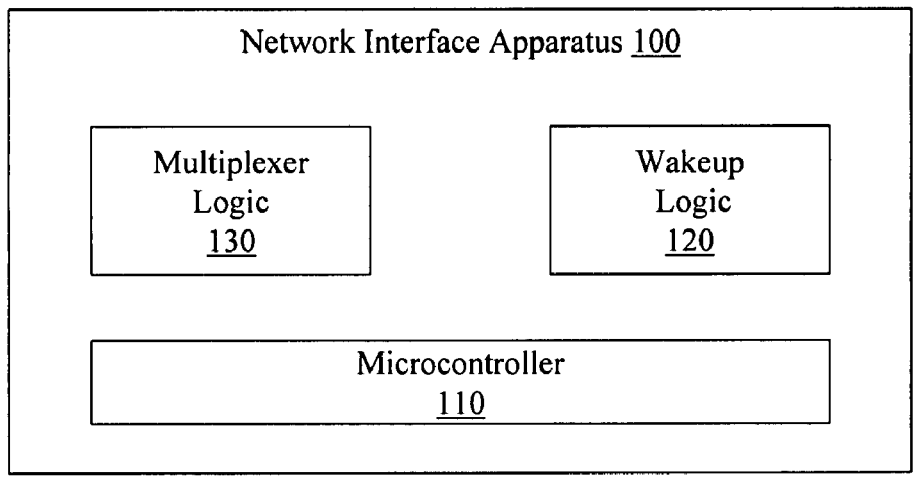
FIG. 1 illustrates an example network interface apparatus.

Example systems include a network interface apparatus (e.g., an intelligent NIC (iNIC)) to perform at least partial communication operations even while a platform with which the iNIC is associated may not be able to process incoming communication signals. For example, a platform may be in a lower power state (e.g., S3 mode) and may be unable to process incoming call signals in a meaningful time period. Example systems may support an active VPN (Virtual Private Network) session (e.g., maintain an always connected VPN tunnel) even while achieving platform power-saving advantages. In one example, incoming VoIP call signals may be detected even when a platform is asleep and a user operating system is not active.

Incoming VoIP signals may be initially handled by the iNIC. The iNIC may include an always-on firmware based logic to handle the incoming signals. The firmware based logic may operate independently of a processor in a system to which the iNIC is operably connected. In one example, the firmware based logic may reside in a microcontroller on the iNIC. In other examples, the firmware based logic may be associated with a processor operating in S3 independent of the main processor. The processor may be associated with the Manageability Engine (ME) or other similar apparatus. When certain signals are received, the iNIC can send a wakeup signal to a platform and/or operating system with which the iNIC is associated. The awakened platform and/or operating system can then handle subsequent VoIP call signals. While VoIP is used in the example, it is to be appreciated that other computer communications (e.g., IM, email) and communication signals may be handled by an iNIC.

Conventional applications running a virtual private network (VPN) may terminate at an operating system running on a computer. These applications typically require an entire platform, including its operating system, to be operational to allow communications. For example, conventional applications may require the operating system to be working in order to accept incoming VoIP SIP (Session Initiation Protocol) based calls over VPNs. To avoid dropping call signals, conventional systems may not offer a sleep mode. In this scenario, a platform may wake up periodically (e.g., every 100 ms) to maintain connectivity with an L2 network using, for example, IEEE 802.11 power saving mechanisms. In a remote connection scenario, (e.g., VPN) this will not produce significant power savings due to L2 protocol requirements. To try to save power, a conventional system may enter and exit a deep sleep mode (e.g., S3) and may register with a network periodically (e.g., every 1 second) while awake. Applications on this platform may be unreachable for the duration of the power save period. Additionally, the platform must wake up periodically to check for incoming network packets.

A typical usage scenario is described below. A mobile user may use an IPsec (Internet protocol security) VPN to connect to an enterprise. Intra-enterprise voice calls may be set up on a mobile user client VoIP soft-phone. The client platform may enter S3 mode as the mobile user moves around. A VPN gateway, VoIP application server, IM peer, and so on, may treat the client as being fully connected even though the platform is asleep. When a communication (e.g., VoIP call, IM, push-email, google-talk) is sent to this client, the iNIC initially processes the call and interacts with the peer, even for VPN based flows. The iNIC can selectively wake up the platform and/or operating system to continue processing the communication. The iNIC can buffer portions of the computer communication for later delivery when the platform and/or operating system are awake. Unlike conventional systems, the computer platform and the operating system may sleep without periodically self-awakening, since they can be awakened by the iNIC. Thus, an always-on always-connected approach can be paired with a power-saving approach.

The following includes definitions of selected terms employed herein. The definitions include various examples and/or forms of components that fall within the scope of a term and that may be used for implementation. The examples are not intended to be limiting.

"Always-on" is used herein according to its computer networking meaning. Thus, "always-on" refers to being substantially always available to communicate.

"Logic", as used herein, includes but is not limited to hardware, firmware, software in execution, and/or combinations thereof to perform a function(s) or an action(s), and/or to cause a function or action from another logic, method, and/or system. Logic may include discrete logic (e.g., application specific integrated circuit (ASIC)), an analog circuit, a digital circuit, a programmed logic device, a memory device containing instructions, and so on. Logic may include a gate(s), a combinations of gates, other circuit components, and so on.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software).

"Signal", as used herein, includes but is not limited to, electrical signals, optical signals, analog signals, digital signals, data, computer instructions, processor instructions, messages, a bit, a bit stream, or other means that can be received, transmitted and/or detected.

FIG. 1 illustrates a network interface apparatus (NIA) 100. In one example, NIA 100 may be an iNIC. NIA 100 may include a microcontroller (uC) 110, a wakeup logic 120, and a multiplexer logic 130. uC 110 may store and execute communication signal processing firmware. In one example, uC 110 controls this firmware to selectively process an incoming communication signal. Whether NIA 100 processes the incoming signal depends on an availability state of a computing platform to which NIA 100 is operably connected. The computing platform may be a mobile platform configured for wireless communications. The firmware may include instructions to perform different actions. The actions may include buffering an incoming call signal, dropping an incoming call signal, performing exception handling based on a property of an incoming call signal, defragmenting a set of incoming packets, and maintaining an active VPN session. The active VPN session may be, for example, an internet protocol security (IPsec) session, a secure socket layer (SSL) session, a transport layer security (TLS) session, a web-based session, and so on. In one example, NIA 100 may maintain multiple VPN sessions having different properties.

Wake up logic 120 may selectively send a state signal to the computing platform to which the NIA 100 is operably connected. Whether the state signal is sent may depend, for example, on the incoming communication signal and the state of the computing platform. Additionally, the value of the state signal may also depend on the incoming communication signal and the state of the computing platform. The state signal may control a logic on the computing platform to change the availability state.

Multiplexer logic 130 may selectively route an incoming communication signal to uC 110 or to the computing platform based, for example, on the availability state. Multiplexer logic 130 may detect a power-save mode of a platform with which NIA 100 interacts and selectively deliver packets to either an operating system, a platform, uC 110 on NIA 100, or another logic on NIA 100, based on a state of the platform and/or the operating system. The state may be, for example, a power-saving state (e.g., S3). While a power saving state is described, the state may be, more generally, an energy efficiency related state. In one example, the multiplexer logic 130 may be associated with layer 2 hardware on apparatus 100. Layer 2 hardware may perform data link level actions. For example, layer 2 hardware may perform MAC (media access control) functions and/or LLC (logical link control) functions. These functions may include, for example, encoding bits into packets and/or decoding packets into bits. In one example, layer 2 link decryption may be performed before the hardware multiplexer function is invoked.

NIA 100 mitigates issues associated with having to wake up a system on every incoming VPN packet. This prevents "false alarm" wake-ups on non-significant packets (e.g., keep alive packets) or packets of non-interest for the applications of interest in S3 mode. NIA 100 also facilitates providing always-on communication for a platform engaged in power-saving.

Figure 2:
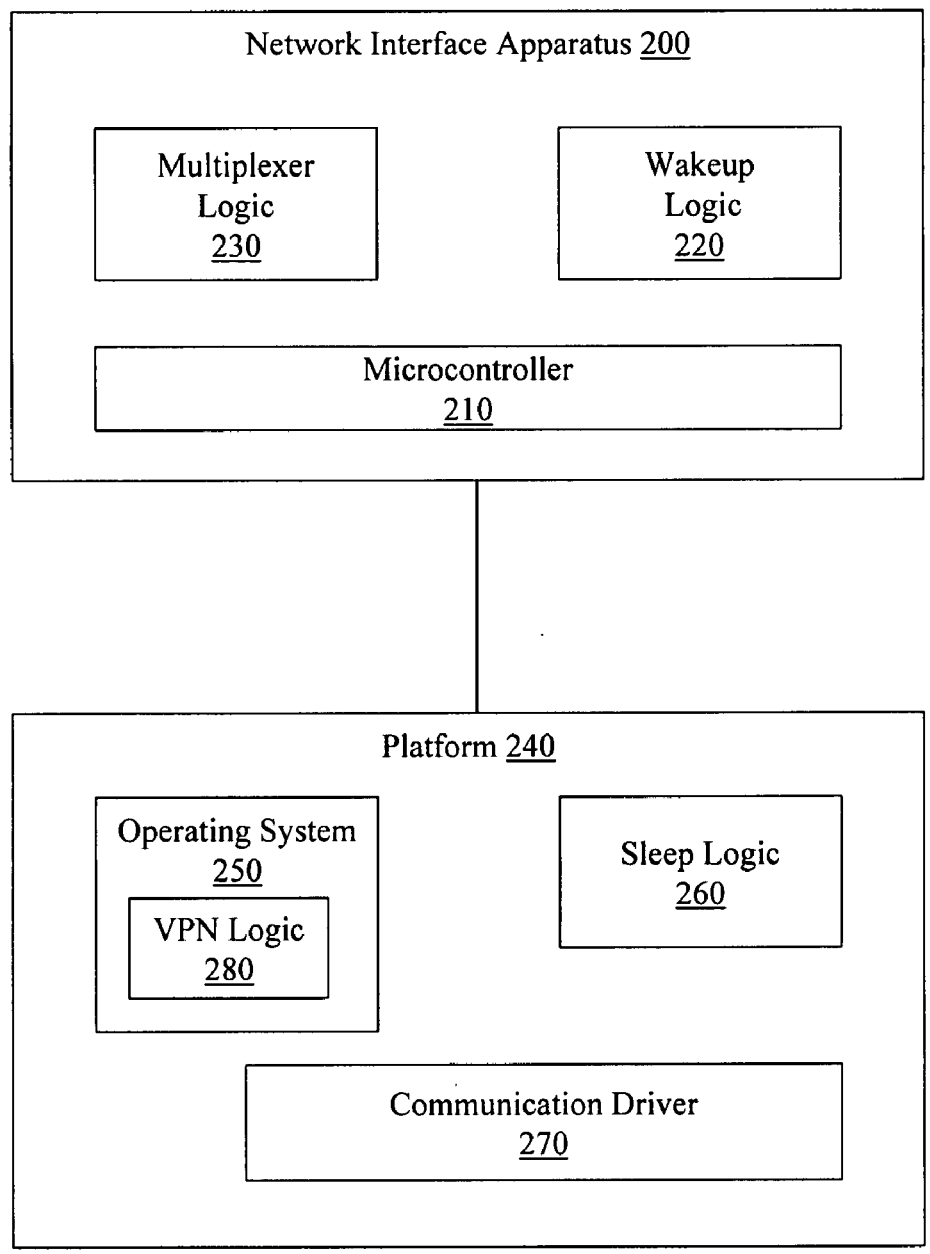
FIG. 2 illustrates an example network interface apparatus operably connected to a platform.

FIG. 2 illustrates a network interface apparatus 200 operably connected to a platform 240. NIA 200 includes elements similar to NIA 100. For example, NIA 200 includes a microcontroller 210, a wakeup logic 220, and a multiplexer logic 230.

Platform 240 may be, for example, a computer (e.g., laptop, notebook, PDA). Platform 240 runs an operating system 250 that interacts with a VPN logic 280. VPN logic 280 may interact with different types of VPNs, (e.g., IPsec VPNs, TLS VPNs, web-based VPNs). Operating system 250 may include a Layer 2 networking driver (e.g., IEEE 802.11r, 11i, 802.16, 3G) and a TCP/IP networking stack. Portions of VPN logic 280 may be associated with the TCP/IP stack and can be considered as a dual function component. VPN logic 280 may establish session keys that are used to encrypt outgoing (egress) packets and to decrypt incoming (ingress) packets. Platform 240 may periodically go to sleep to conserve energy. This sleep action may be controlled by a sleep logic 260.

Platform 240 may include a lower layer communication driver 270 to communicate with NIA 200 and/or with microcontroller (uC) 210. In one example, NIA 200 may include independent firmware in, for example, the uC 210. The firmware may implement advanced management technology (AMT) functionality. One skilled in the art will appreciate that in some examples the AMT functionality may be provided by a separate processor. AMT functionality may provide out-of-band (OOB) communications independent of operating system 250 or main processor support. The AMT functionality may be provided regardless of a power state of the platform 240 or the NIA 200. Thus, the OOB communication may be always available to process incoming call signals. Thus NIA 200 may be able to communicate with devices even when platform 240 is asleep, not booted, or otherwise unavailable. An iNIC configured with firmware supporting AMT functionality may be referred to as a NIC/AMT.

Figure 3:
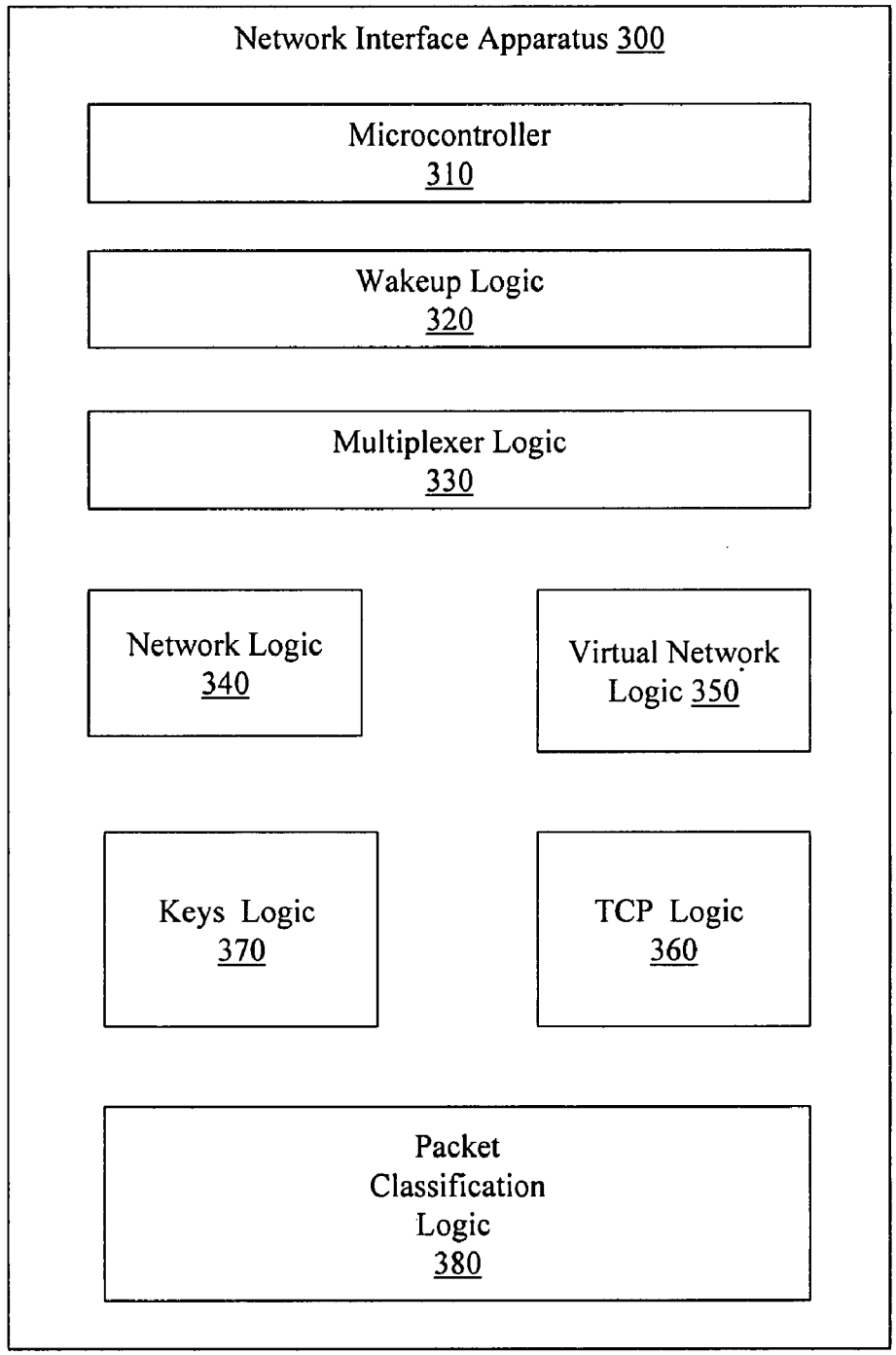
FIG. 3 illustrates an example network interface apparatus.

NIA 200 may include components not traditionally found on a NIC. In one example, the additional components may be associated with a uC on a NIC/AMT platform. Example additional components are illustrated in FIG. 3, which is described below. Communication data and functionality may be transferred to uC 210 on NIA 200. This allows platform 240 to go into an energy efficient (e.g., power saving) mode while maintaining VPN communications.

In one example, platform 240 can be configured to enter a deep power-save mode and to selectively enable VoIP Session Initiation Protocol (SIP) incoming call detection by NIA 200. In one example, incoming packets are processed by uC 210. For example, incoming packet SIP headers may be examined and wakeup logic 220 may selectively wake up platform 240 when an incoming call is detected as determined by the examination of the headers. In another example, network interface apparatus 200 may support more than one active connection at a time. Thus, network interface apparatus 200 can support a client that executes multiple applications at the same time. Wake up contexts can be programmed into the wakeup logic 220 to detect appropriate events from selected peer identities. Multiple connection contexts may exist when a client roams between heterogeneous networks (e.g., 802.11 WLAN, 802.16 WMAN, 3G) and maintains an IPsec VPN connection. These connections may include wireless connections.

In one example, NIA 200 may receive a configuration signal from platform 240. The configuration signal may control NIA 200 to perform VoIP session initiation protocol (SIP) incoming call detection. The configuration signal may be received over a wireless connection.

FIG. 3 illustrates a network interface apparatus 300 that includes some elements similar to those described in connection with network interface apparatus 100. For example, network interface apparatus 300 includes a microcontroller 310, a wakeup logic 320, and a multiplexer logic 330. However, network interface apparatus 300 may include additional elements. Network interface apparatus 300 may be, for example, an iNIC.

NIA 300 may include a network logic 340 to provide a minimal network driver to maintain connectivity with an access point (AP) and/or switch. An "access point" may include, for example, an 802.11 AP, an 802.16 base station, connectivity apparatus associated with cellular telephony and/or 3G telephony, and so on. Network logic 340 may be, for example, a layer 2 network logic. NIA 300 may also include a virtual network logic 350 to create a virtual network IP adapter on NIA 300. In one example, virtual network logic 350 may be implemented in uC 310. The virtual network IP adapter may have the same characteristics as an operating system with which NIA 300 may interact. In one example the virtual network IP adapter on NIA 300 will have the same IP address as a VPN virtual adapter on the operating system.

NIA 300 may also include a transmission control protocol (TCP) logic 360 to provide a TCP/IP stack on NIA 300. The TCP/IP stack is a fully operational networking stack and will accept incoming packets over the VPN adapter. In one example, the TCP/IP stack may be implemented in uC 310. A VPN gateway from which incoming packets will be received is required to neither know nor care whether it is communicating with an operating system or uC 310.

NIA 300 may also include a keys logic 370 to receive ingress VPN keys from an operating system with which NIA 300 will interact. Receiving the ingress VPN keys facilitates decrypting incoming packets on NIA 300. In one example, the keys logic 370, the operating system, and uC 310 will store certificate-based authentication credentials that will be validated before ingress key transfer occurs to prevent unauthorized key transfer. In a different example, an alternate symmetric key wrap protocol (e.g., NIST (National Institute Standards Technology)) may be used.

NIA 300 may also include a packet classification logic 380 to match decrypted VPN packets against classified packet patterns. uC 310 may selectively wake up an operating system and/or platform based on matches. uC 310 may, additionally and/or alternatively, selectively buffer or drop packets based on mismatches. Additionally, and/or alternatively, uC 310 can selectively de-fragment packets and/or mark fragmented packets for exception handling. The exceptions handled may include, for example, a VPN key management query from a gateway, key revocation, session re-keying, fragmented IP packets, IP packets for unknown applications, and so on. In different examples, packet classification rules can be set by an IT administrator, a user, and so on.

Figure 4:
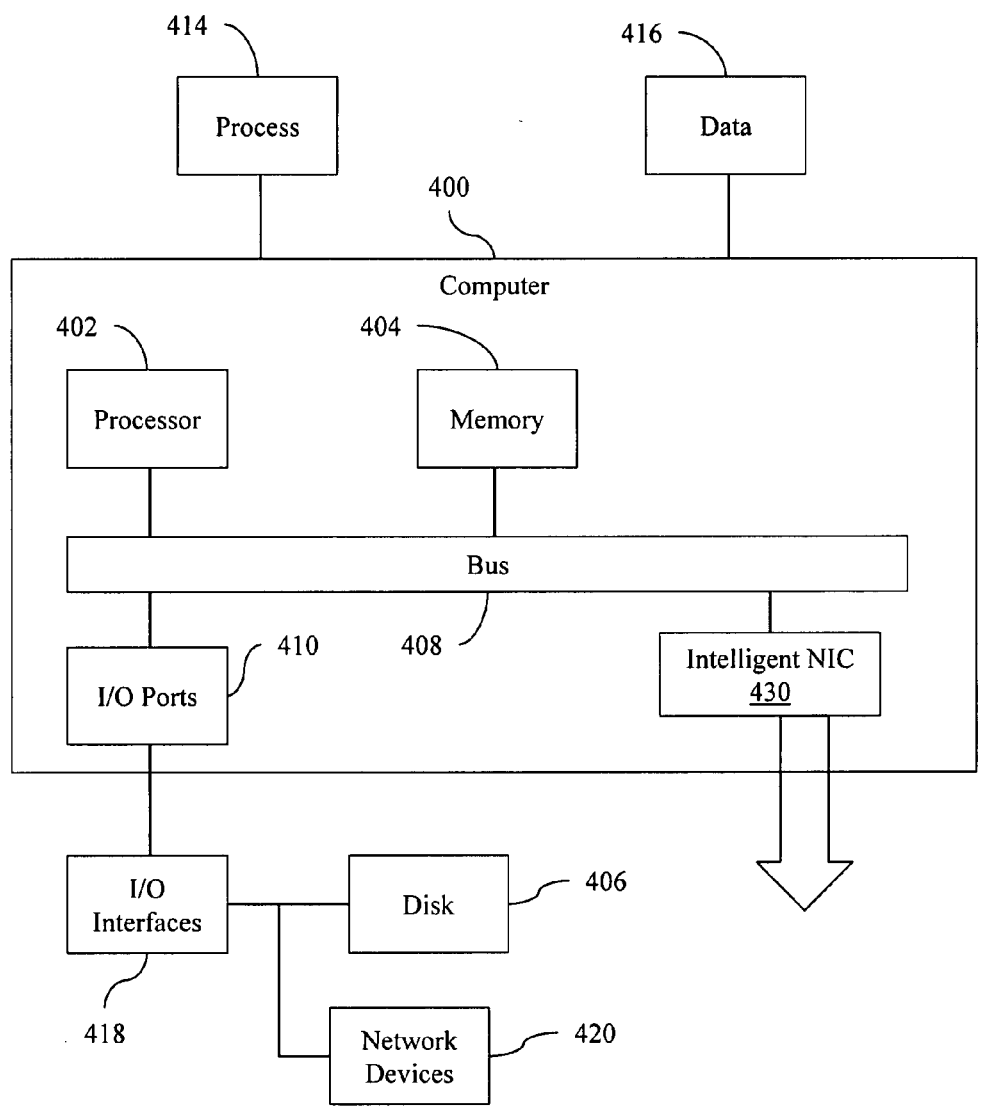
FIG. 4 illustrates an example computing environment in which a network interface apparatus may operate.

FIG. 4 illustrates an example computing device in which example systems described herein, and equivalents, may operate. The example computing device may be a computer 400 that includes a processor 402, a memory 404, and input/output ports 410 operably connected by a bus 408. In one example, the computer 400 may include an iNIC 430 configured to facilitate always-on always-connected communications for computer 400, even when computer 400 is in an energy saving mode or otherwise unavailable.

Generally describing an example configuration of the computer 400, the processor 402 may be a variety of various processors including dual microprocessor and other multiprocessor architectures. A memory 404 may include volatile memory and/or non-volatile memory. A disk 406 may be operably connected to the computer 400 via, for example, an input/output interface (e.g., card, device) 418 and an input/output port 410. The memory 404 can store a process 414 and/or a data 416, for example. The disk 406 and/or the memory 404 can store an operating system that controls and allocates resources of the computer 400.

The bus 408 may be a single internal bus interconnect architecture and/or other bus or mesh architectures. While a single bus is illustrated, it is to be appreciated that the computer 400 may communicate with various devices, logics, and peripherals using other busses (e.g., PCIE, SATA, Infiniband, 1394, USB, Ethernet). The bus 408 can be types including, for example, a memory bus, a memory controller, a peripheral bus, an external bus, a crossbar switch, and/or a local bus.

The computer 400 may interact with input/output devices via the i/o interfaces 418 and the input/output ports 410. The computer 400 can operate in a network environment and thus may be connected to the network devices 420 via the i/o interfaces 418, the i/o ports 410, and/or the iNIC 430. The computer 400 may interact with a network. Through the network, the computer 400 may be logically connected to remote computers. Networks with which the computer 400 may interact include, but are not limited to, a local area network (LAN), a wide area network (WAN), 3G, and other networks. The connections may include, for example, VPN connections.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". The term "and/or" is used in the same manner, meaning "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A network interface apparatus (NIA) comprising:
a microcontroller (uC) to store and execute communication signal processing firmware, where the uC is to control the firmware to selectively process an incoming communication signal based, at least in part, on an availability state of a computing platform to which the NIA is operably connected, where the incoming communication signal being associated with one of, a voice over internet protocol (VoIP) application, an instant messaging (IM) application, an electronic mail (email) application, and an application using a virtual private network (VPN);
a wake up logic to selectively send a state signal to the computing platform based, at least in part, on the incoming communication signal, where the state signal is configured to control a logic on the computing platform to change the availability state;
a multiplexer logic to selectively route the incoming communication signal to one of, the uC, and the computing platform based, at least in part, on the availability state;
where the NIA further comprises:
    a network logic to maintain connectivity with an access point;
    a virtual network logic to provide a virtual network IP adapter on the NIA;
    a TCP logic to provide a TCP/IP stack on the NIA, the TCP/IP stack being configurable to communicate with a TCP/IP stack on the computing platform;
    a keys logic to receive an ingress VPN key from the computing platform, the ingress VPN key being available to decrypt an incoming packet;
    a packet classification logic to identify a match between a decrypted VPN packet and a packet pattern;
    where the availability state is a sleep state associated with an energy efficient mode; where the NIA is to maintain an active VPN session for the computing platform regardless of the availability state, the active VPN session being one of, an IPsec session, a SSL session, a TLS session, and a web-based session, and where the network interface apparatus is to handle multiple VPN sessions having different properties;
    where the NIA is to receive a configuration signal from the computing platform, the configuration signal to control the network interface apparatus to perform VoIP SIP incoming call detection; and
    where the firmware includes executable instructions to perform one or more of, buffering one or more incoming call signals, dropping an incoming call signal, performing exception handling based on a property of an incoming call signal, and de-fragmenting a set of incoming packets.

2. The network interface apparatus of claim 1, the network interface apparatus to maintain an active VPN session for the computing platform independent of the availability state.

3. The network interface apparatus of claim 2, the active VPN session being one of, an internet protocol security (IPsec) session, a secure socket layer (SSL) session, a transport layer security (TLS) session, and a web-based session, and where the network interface apparatus is to handle multiple VPN sessions having different properties.

4. The network interface apparatus of claim 1 where the network interface apparatus is to receive a configuration signal from the computing platform, the configuration signal to control the network interface apparatus to perform VoIP session initiation protocol (SIP) incoming call detection.

5. The network interface apparatus of claim 1, the computing platform to which the network interface apparatus is operably connected comprising:
an operating system to run a communication application for which the incoming communication signal is intended;
a sleep logic to selectively control the availability state, the availability state being a power control state; and
a communication driver to facilitate communications between the computing platform and the network interface apparatus.

6. The network interface apparatus of claim 5, where the operating system includes a VPN logic to implement a VPN between the communication application and a remote application.

7. The network interface apparatus of claim 1, the computing platform being a mobile platform configured for wireless communications.

* * * * *